April 14, 1964 R. C. ZEIDLER 3,128,640
VIBRATION DAMPENERS
Filed Feb. 9, 1962
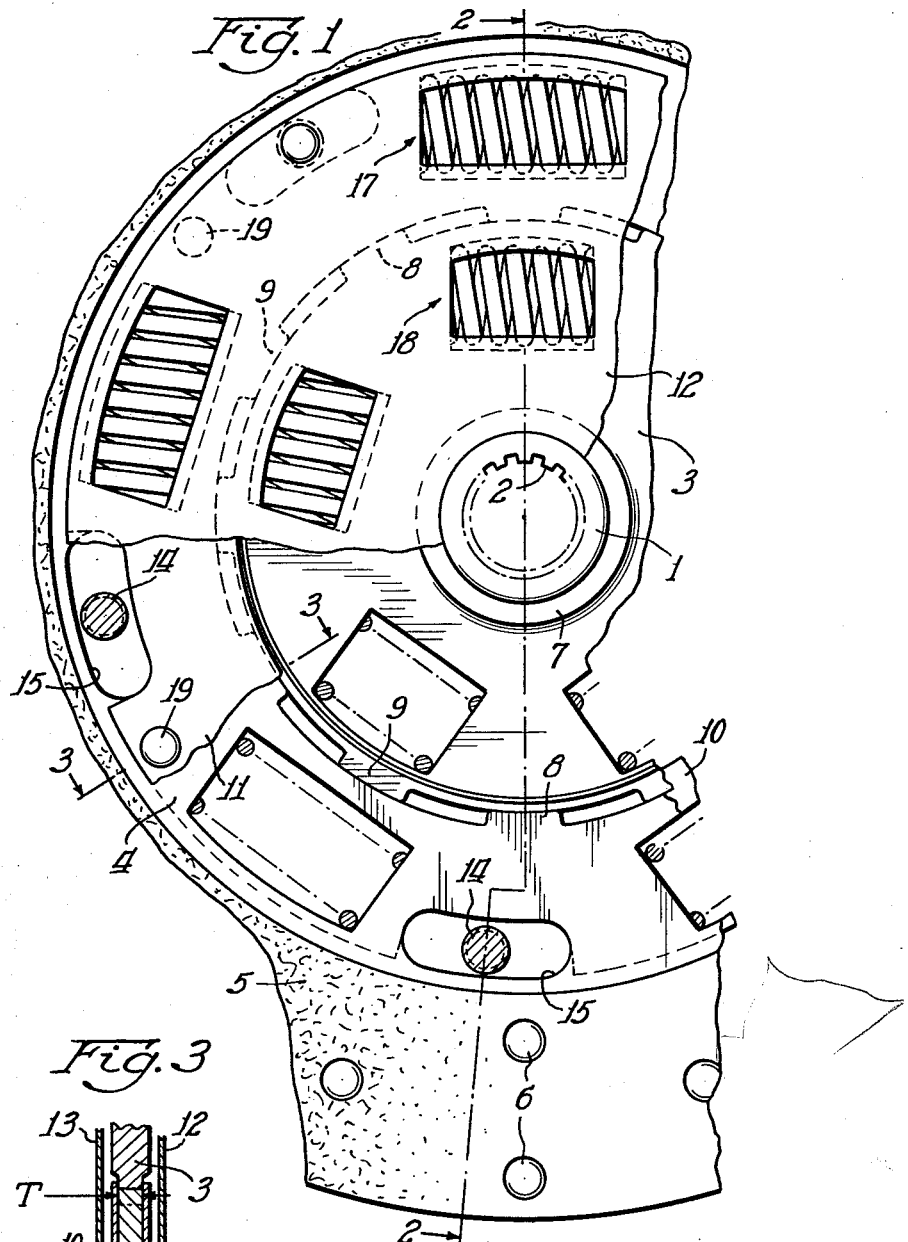
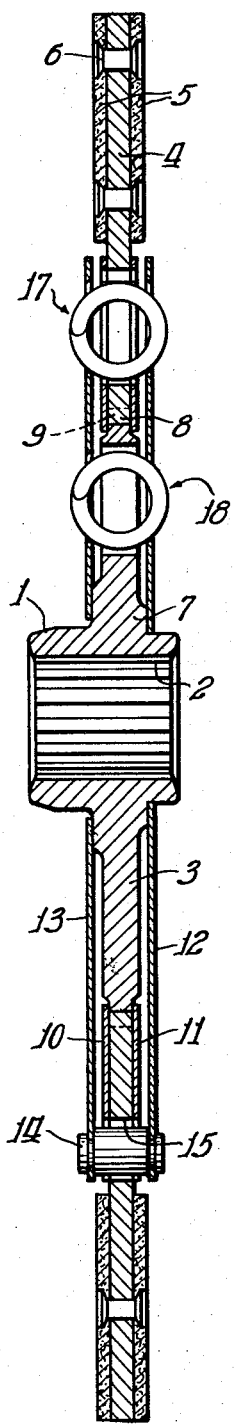
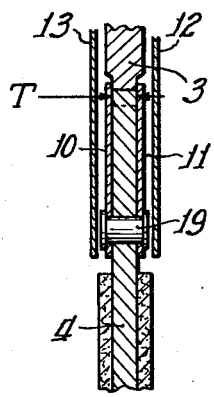
Inventor:
Reinhold C. Zeidler
By: John W Butcher
Atty

United States Patent Office 3,128,640
Patented Apr. 14, 1964

3,128,640
VIBRATION DAMPENERS
Reinhold C. Zeidler, Detroit, Mich., assignor to Borg-Warner Corporation, Chicago, Ill., a corporation of Illinois
Filed Feb. 9, 1962, Ser. No. 172,255
9 Claims. (Cl. 74—574)

This invention relates to structure for transmitting a rotary power drive operable to dampen vibrations, and is particularly suited for incorporation as the driven plate member in a heavy-duty vehicle clutch. The present invention may be described as an improvement over a particular structure described and claimed in the related copending United States patent application by Clinton V. Stromberg, Serial Number 172,547, entitled "Vibration Dampeners," filed February 12, 1962.

One of the assemblies described in the aforementioned application comprises a so-called concentric clutch plate design employing two sets of vibration dampening means whereby torque is transmitted from a driven disc having friction facings thereon, through a first set of spring means to a pair of washers and from said washers, through a second set of spring means to an annular flange of a hub. In most vibration dampener applications, a certain amount of damping friction or hysteresis, which may be defined as the friction force that retards the efforts of the springs to return the damper to the zero or neutral, no-load position, is required together with a certain amplitude of relative angular movement in order to obtain satisfactory results. In some cases, the value of friction and the closeness to which this value is held is quite critical. Commonly the degree of friction is controlled by the clamping force of the side plates or washers against the machined shoulder surfaces of the hub. The thickness at the shoulder and the length of the shoulder portion of the shoulder rivets are principal factors in regulating the amount of friction. Sometimes washers or shims of a friction material are interposed between the side plates and the hubs to increase or give better control of friction. In the aforementioned Stromberg clutch plate design, friction force is applied by the side plates or washers adjacent the thickened radially innermost portion of the hub. Also frictional force can be applied between the flange and the disc member and between one washer and the friction disc member. This arrangement, however, is somewhat difficult to control since the shoulder rivets are the only friction producing or clamping force in the combination.

The present invention is in the nature of an improvement over the concentric design of Stromberg in that it utilizes two sets of side plates to permit independent friction control in a concentric design. The friction between the washers or side plates and the thickened innermost portion of the hub flange is controlled by the shoulder rivets which connect the washers or the side plates together while the frictional force at the point where the annular disc engages the flange is controlled by the thickness of the flange at its outer peripheral portion.

It is therefore one object of the present invention to provide a new and improved clutch device with vibration damper structure which will effectively dampen the torsional vibrations in a drive line and which structure can be effectively controlled with respect to the relative frictional engagement between adjacent moving parts.

Other objects and features of the invention will be readily apparent to those skilled in the art from the specification and appended drawing illustrating a preferred embodiment in which:

FIGURE 1 is a partial side elevational view, with portions broken away to facilitate the showing, of a clutch driven member incorporating the principles of the present invention;

FIGURE 2 is a sectional view taken along the plane of line 2—2 of FIGURE 1; and

FIGURE 3 is a sectional view taken along the plane of line 3—3 of FIGURE 1.

As shown most clearly in FIGURES 1 and 2, the present invention comprises a hub 1 having an internally splined opening 2 extending therethrough and an annular, radially extending flange 3 having a thickened radially innermost portion 7, a peripheral portion with flat machined sides or faces having a reduced thickness relative to the main body of said flange, and a plurality of peripheral, radially extending, spaced lugs 9, the purpose of which will be described below. An annular disc 4 is supported on the outer edge of the flange 3 and is provided with friction facings 5. The friction facings 5 are secured to the radially outer portion of the annular disc 4 by a plurality of rivets 6 or in any other well known manner. On the edge of the annular disc are a plurality of inwardly extending spaced lugs 8, which are adapted to interlock with the spaced, outwardly extending lugs 9 on the annular flange 3 of the hub. These lugs are positioned, as seen in FIGURE 1, so that they function as stop means to limit the angular deflection of the annular disc 4 relative to the flange 3.

On both sides of the annular disc 4 retainer means are provided in the form of flat annular discs or plates 10 and 11 which may be riveted such as, for example, at 19 (FIGURE 3) or otherwise suitably secured thereto to provide an annular recessed portion or groove on the radially inner edge of the annular disc. This annular recessed portion is adapted to accommodate the outer peripheral edge of the annular flange 3. A pair of washers or side plates 12, 13 are positioned on both sides of the hub flange and disc member 4. Means are provided for effecting a frictional damping arrangement between the washers or side plates 12, 13 and the annular flange 3 of the hub, whereby relative movement between said washers and said annular flange is frictionally retarded. In the example, the washers have a radially innermost portion in frictional engagement with the side portions of flange 3, more specifically with the sides of the radially innermost thickened portion 7 of said flange 3. Such thickened portion 7 is provided with flattened faces against which the washers are pressed to provide a friction area thereon. The washers 12, 13 are connected together in fixed, spaced relation such as, for example, by a plurality of shoulder rivets 14 which extend through elongated apertures or slots 15 in the annular disc member 4, the ends of these slots functioning as a stop means to limit the movement of the disc 4 relative to the fixed washers 12, 13. Two concentric circular rows of resilient means such as, for example, springs 17 and 18 are seated within a plurality of coaligned or registered apertures in the washers, the annular disc member and flange member respectively. This installation and the function of the spring means is well known in the art and is particularly described in the aforementioned Stromberg application.

From the foregoing description, it should be clear that torque transmitted from a drive means to the friction facings on the annular disc member 4 will be transmitted through the first set of spring means 17 to the outer portion of the annular washers 12, 13. The annular washers in turn transmit torque through inner spring means 18 to the outer portion of the annular flange 3 on the hub 1. By this arrangement, an annular deflection of approximately 15 to 18 degrees can be obtained which is advantageous in heavy duty installations where such maximum amplitude is a requirement for effective dampening of the torque transmission system. Also by this arrangement the frictional forces on the relative moving parts may be closely controlled to secure a maximum friction damping effect preventing the relative parts from moving to the neutral or no-load position too rapidly. The frictional force of the washers against the annular flange may be appropriately controlled by the width of shoulder rivet 14 while the engagement of the annular disc member with respect to the outer part of the annular flange can be controlled by varying the thickness T (FIGURE 3) of the radially outermost portion of said annular flange 3. It is an important feature of this invention that the friction adjustment provisions, i.e., rivets 14 as applied to the washers 12 and 13 and rivets 19 as applied to plates 10 and 11, are independent of each other. This enables the assembly to be adjusted to a desirable hysteresis factor between the first spring 17 and the juncture between the plates and the hub 3 and to a different desirable hysteresis factor between the second spring 18 and the juncture between the washers and the enlarged portion 7 of the hub 3.

While a certain preferred embodiment of the invention has been specifically disclosed, it is understood that the invention is not limited thereto as many variations will be readily apparent to those skilled in the art and the invention is to be given its broadest possible interpretation within the terms and scope of the following appended claims.

What is claimed is:

1. A vibration dampener comprising a hub having an annular radially extending flange, said flange having a peripheral edge portion and side portions; an annular disc member mounted for rotational movement on the edge portion of said flange; means providing a frictional connection between said annular disc member and said flange; washer means positioned on opposite sides of said flange, means providing a frictional damping relationship between said washer means and said annular flange whereby relative movement therebetween is frictionally retarded; first resilient means interconnecting said annular disc member and said washer means; and second resilient means interconnecting said washer means and said flange.

2. A vibration dampener as defined in claim 1 wherein said means providing a frictional connection comprises a pair of ring members connected to said annular disc member, said ring members being in frictional engagement with said side portions of said flange.

3. A vibration dampener as defined in claim 1 including means for interconnecting said washer means together for common movement.

4. A vibration dampener as defined in claim 1 wherein said annular disc member includes a radially innermost portion having a plurality of spaced, radially inwardly extending lugs; and wherein said peripheral edge portion of said flange is provided a plurality of spaced, radially outwardly extending lugs, the lugs on said disc member and said flange cooperating to limit relative rotational movement between said disc member and said flange.

5. A vibration dampener comprising a hub having an annular, radially extending flange, said flange having a peripheral edge portion, side portions and a thickened radially innermost portion; a plurality of spaced, radially outwardly extending lugs on said peripheral edge portion; an annular disc member mounted for rotational movement on said peripheral edge portion of said flange, said disc member having spaced, radially inwardly extending lugs cooperating with said outwardly extending lugs to limit relative rotational movement between said flange and said disc member; a pair of ring members connected to said disc member in frictional engagement with said side portions of said flange; washer means on opposite sides of said flange in frictional engagement with said thickened portion of said flange; first resilient means interconnecting said disc member and said washer means; and second resilient means interconnecting said washer means and said flange.

6. A vibration dampener as defined in claim 5 including washer interconnecting means connecting said washer means together for common movement.

7. A vibration dampener as defined in claim 6 including means defining a slot in said disc member, said washer interconnecting means cooperating with said slot to limit relative rotational movement between said washer means and said disc member.

8. A vibration dampener as defined in claim 5 wherein said washer interconnecting means comprises a shoulder rivet for spacing said washer means, whereby the frictional engaging force of said washer means on said thickened portion of said flange can be controlled.

9. A vibration dampener as defined in claim 5 wherein said washer means and said disc member are each provided with apertures coaligned with respect to each other to form a first set of apertures and wherein said washer means and said flange are each provided with apertures coaligned with respect to each other to form a second set of apertures and wherein said first resilient means comprises a spring positioned in said first set of apertures, and wherein said second resilient means comprises a spring positioned in said second set of apertures.

References Cited in the file of this patent

UNITED STATES PATENTS

| | | |
|---|---|---|
| 1,861,251 | Wemp | May 31, 1932 |
| 2,065,601 | Meyer | Dec. 29, 1936 |